(12) United States Patent
Zhang et al.

(10) Patent No.: US 8,233,734 B2
(45) Date of Patent: Jul. 31, 2012

(54) IMAGE UPSAMPLING WITH TRAINING IMAGES

(75) Inventors: Yonghua Zhang, Beijing (CN); Lin Ma, Beijing (CN); Feng Wu, Beijing (CN)

(73) Assignee: Microsoft Corporation, Redmond, WA (US)

( * ) Notice: Subject to any disclaimer, the term of this patent is extended or adjusted under 35 U.S.C. 154(b) by 982 days.

(21) Appl. No.: 12/235,472

(22) Filed: Sep. 22, 2008

(65) Prior Publication Data

US 2010/0074549 A1    Mar. 25, 2010

(51) Int. Cl.
*G06K 9/40* (2006.01)

(52) U.S. Cl. ........ 382/254; 382/275; 382/299; 382/300; 358/525; 358/540; 358/463

(58) Field of Classification Search .............. 382/260, 382/274, 275; 358/3.26, 3.27, 463
See application file for complete search history.

(56) References Cited

U.S. PATENT DOCUMENTS

| | | | |
|---|---|---|---|
| 6,005,983 A | 12/1999 | Anderson et al. | |
| 6,469,290 B1* | 10/2002 | Suzuki | 250/208.1 |
| 6,496,184 B1 | 12/2002 | Freeman et al. | |
| 6,766,067 B2 | 7/2004 | Freeman et al. | |
| 6,841,780 B2* | 1/2005 | Cofer et al. | 250/341.1 |
| 7,006,881 B1* | 2/2006 | Hoffberg et al. | 700/83 |
| 7,106,914 B2 | 9/2006 | Tipping et al. | |
| 7,133,148 B2* | 11/2006 | Silverstein | 358/1.15 |
| 7,218,796 B2 | 5/2007 | Bishop et al. | |
| 7,242,988 B1* | 7/2007 | Hoffberg et al. | 700/28 |
| 7,298,929 B2* | 11/2007 | Akiyoshi et al. | 382/300 |
| 7,487,491 B2* | 2/2009 | Oaki et al. | 716/51 |
| 7,623,163 B2* | 11/2009 | Neter | 348/247 |
| 7,684,487 B2* | 3/2010 | Nakaya et al. | 375/240.16 |
| 2005/0019000 A1 | 1/2005 | Lim et al. | |
| 2005/0220355 A1 | 10/2005 | Sun et al. | |
| 2006/0002635 A1 | 1/2006 | Nestares et al. | |
| 2007/0041663 A1 | 2/2007 | Cho et al. | |
| 2007/0103595 A1 | 5/2007 | Gong et al. | |
| 2008/0069438 A1 | 3/2008 | Winn et al. | |

OTHER PUBLICATIONS

Jia, et al., "Hallucinating Multiple Occluded CCTV Face Images of Different Resolutions", In Proc. IEEE International Conference on Advanced Video and Signal based Surveillance (AVSS'05), Sep. 2005, 6 pages.

"Super-Resolution Using a Markov Network Approach", Modification Date: Jan. 23, 2007, 1 page. http://www.merl.com/projects/superres/.

Baker, et al., "Hallucinating Faces", Fourth International Conference on Automatic Face and Gesture Recognition, Mar. 2000, 6 pages.

(Continued)

*Primary Examiner* — Yosef Kassa
(74) *Attorney, Agent, or Firm* — Alleman Hall McCoy Russell & Tuttle LLP (57) ABSTRACT

Images are upsampled using a knowledge base derived from a plurality of high-quality training images. The knowledge base is used to refine a high-frequency component including high-frequency aspects of a high-resolution, low-frequency image, interpolated from a low-resolution full-frequency image, into a high-frequency component. An enhancement step is performed without using a knowledge base to construct a high-compatibility component from the low-resolution, full-frequency image. The low-resolution, full-frequency image is combined with the coarse high-frequency component to yield an enhanced high-frequency component. A second knowledge base step is performed to construct an improved high-frequency component from the enhanced high-frequency component. The improved high-frequency component is blended with a high-resolution, low-frequency image to yield a high-resolution image.

20 Claims, 4 Drawing Sheets

OTHER PUBLICATIONS

Jia, et al., "Multi-Resolution Patch Tensor for Facial Expression Hallucination", Proceedings of the 2006 IEEE Computer Society Conference on Computer Vision and Pattern Recognition (CVPR'06), 8 pages.

Freeman, et al., "Learning Low-Level Vision", International Journal of Computer Vision 40(1), 2000, pp. 25-47.

Liu, et al., "A Two-Step Approach to Hallucinating Faces: Global Parametric Model and Local Nonparametric Model", 2001 IEEE Computer Society Conference on Computer Vision and Pattern Recognition (CVPR'01)—vol. 1, 2001, 7 pages.

Sun, et al., "Image Hallucination with Primal Sketch Priors", in Proc. IEEE conf. on Computer Vision and Pattern Recognition, CVPR'03, 2003, 8 pages.

Chang, et al., "Super-Resolution Through Neighbor Embedding" Conference on Computer Vision and Pattern Recognition, 2004, 8 pages.

Fan, et al., "Image Hallucination Using Neighbor Embedding over Visual Primitive Manifolds", IEEE Conference onComputer Vision and Pattern Recognition, 2007. CVPR,07, Jun. 17-22, 2007, 7 pages.

Li, et al., "Incorporating Primal Sketch Based Learning Into Low Bit-Rate Image Compression", in Proceedings of ICIP (3), 2007, pp. 173-176.

Wu, et al, "Image Compression by Visual Pattern Vector Quantization (VPVQ)", Data Compression Conference, 2008, Mar. 25-27, 2008, pp. 123-131.

Burt, et al., "The Laplacian Pyramid as a Compact Image Code", IEEE Transactions on Communications, vol. Com-3I, No. 4, Apr. 1983, pp. 523-540.

Greenspan, et al., "Image Enhancement by Nonlinear Extrapolation in Frequency Space", IEEE Transactions on Image Processing, vol. 9, No. 6, Jun. 2000, pp. 1035-1048.

Jeon, et al., "Resolution Enhancement by Prediction of the High-Frequency Image Based on the Laplacian Pyramid", EURASIP Journal on Applied Signal Processing vol. 2006, Article ID 72520, 11 pages.

Ramponi, et al., "A Rational Unsharp Masking Technique", Journal of Electronic Imaging, 1998, vol. 7, 11 pages.

"Kodak Lossless True Color Image Suite", 4 pages. http://r0k.us/graphics/kodak/.

Irani, et al., "Motion Analysis for Image Enhancement, Resolution, Occlusion, and Transparency", Journal of Visual Communication and Image Representation,1993, vol. 4, 24 pages.

* cited by examiner

IMAGE UPSAMPLING WITH TRAINING IMAGES

BACKGROUND

Digital images, used as single images and/or in collections of images used to form a video stream, comprise a set number of pixels. Oftentimes it may be desirable to construct an image comprising more pixels than are present in the original image.

One approach to such image upsampling is called interpolation, where an algorithm is used to create additional pixels based on existing pixel information in adjacent regions of the image. Several challenges exist in upsampling methods that rely on interpolation, including preserving details of the image and reducing the amount of visual artifacts, such as "jaggy" edges, introduced during the interpolation process.

SUMMARY

Various embodiments related to image upsampling with training images are disclosed herein. One disclosed embodiment includes a method of upsampling an image using a knowledge base derived from a plurality of high-quality training images. First, a knowledge base is used to construct a high-frequency component comprising high-frequency aspects of a high-resolution, low-frequency image, interpolated from a low-resolution full-frequency image. Such a step yields a coarse high-frequency component. Next, an enhancement step is performed without using a knowledge base, to construct a high-compatibility component from the low-resolution, full-frequency image that when combined with the coarse high-frequency component yields an enhanced high-frequency component. Next, a second knowledge base step is performed to construct an improved high-frequency component from the enhanced high-frequency component. Lastly, the improved high-frequency component is blended with a high-resolution, low-frequency image to yield a high-resolution full-frequency image.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The present disclosure is directed to methods of upsampling an image. As described in detail below, knowledge derived from a plurality of high-quality, high-resolution training images may be used to improve high-frequency detail in images that have been upsampled from low-resolution images. The herein described methods may be applied to single images and/or collections of images used to form a video stream.

Figure 1:
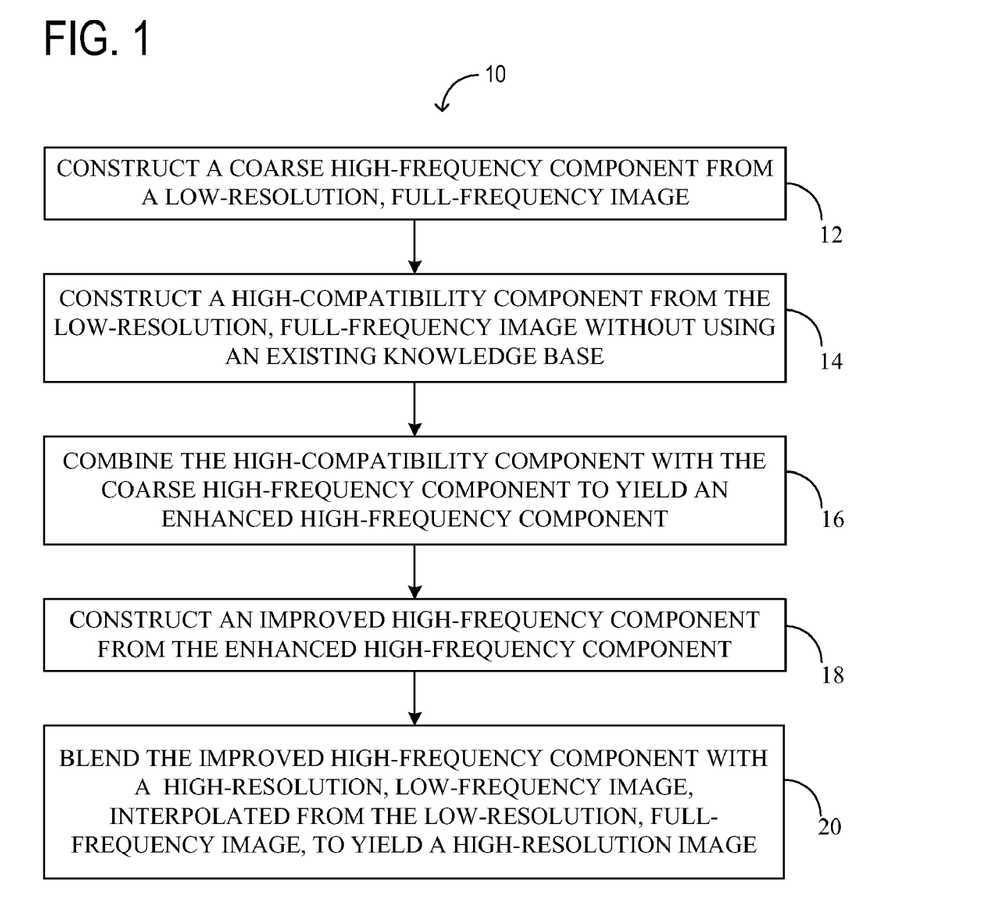
FIG. 1 shows a process flow of a method of upsampling an image in accordance with an embodiment of the present disclosure.

FIG. 1 shows a flowchart of an example method 10 of upsampling an image. At 12, method 10 includes constructing a coarse high-frequency component from a low-resolution, full-frequency image. The term "hallucination" may be used to refer to this step in the upsampling process. The coarse high-frequency component may be constructed with the help of a knowledge base comprising knowledge learnt from a set of high-quality, high-resolution training images.

The knowledge comprises pairs of patches relating low- and high-resolution image information derived from each high-quality, high-resolution training image, where each patch comprises a plurality of adjacent pixels in the image. Moreover, each patch contains a primitive, and therefore may be categorized according to the subclass to which the primitive belongs, including but not limited to an edge, a ridge or a corner at different orientations and scales.

The low-resolution, full-frequency image may be interpolated into a high-resolution, low-frequency image comprising a plurality of low-frequency primitives. A sample low-frequency patch including the low-frequency primitive is defined for each low-frequency primitive.

The purpose of constructing the coarse high-frequency component is to blend each sample low-frequency patch with a high-frequency patch from the learnt knowledge. Any suitable method may be used for selecting the high-frequency patch from the knowledge base.

Figure 2:
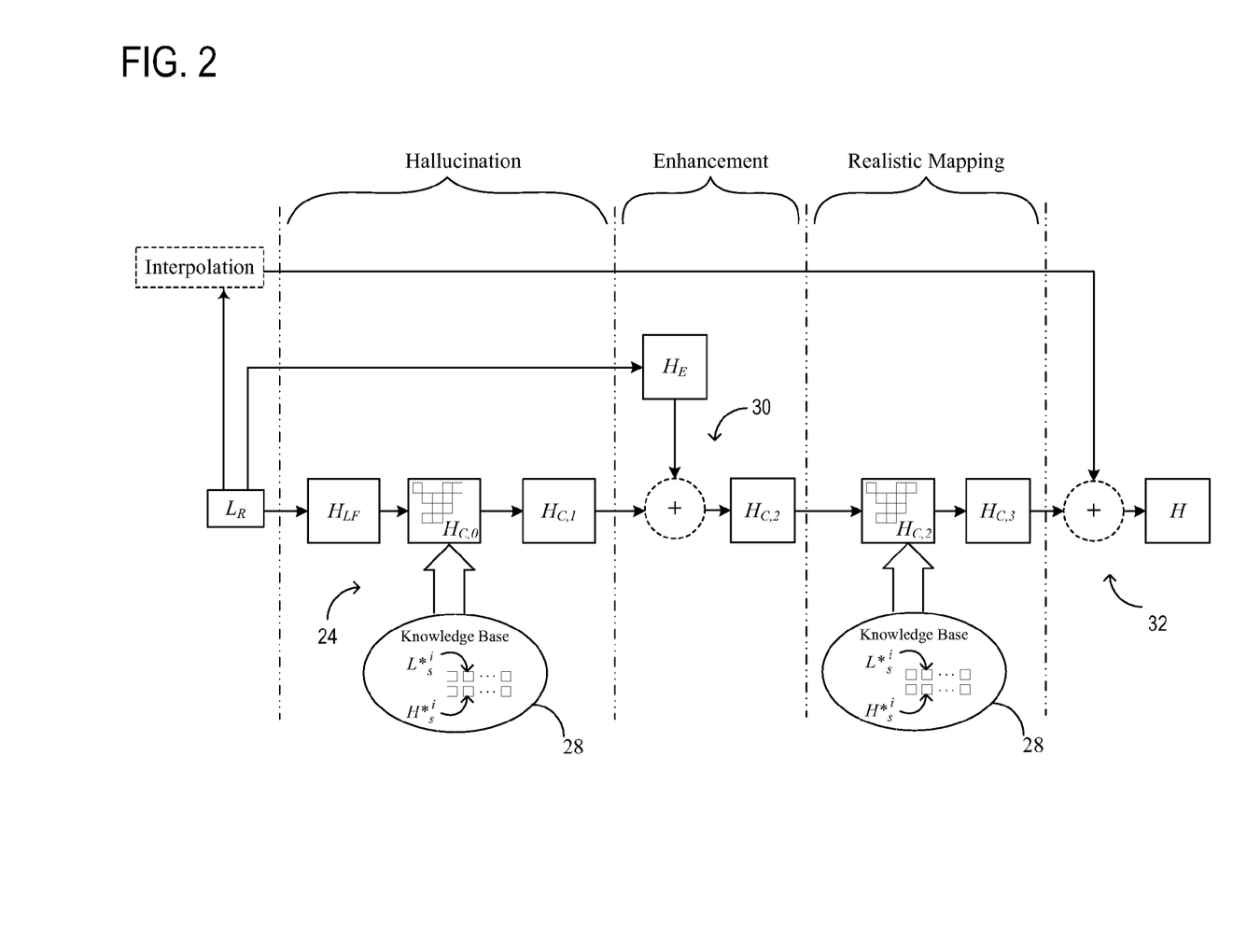
FIG. 2 schematically shows an exemplary embodiment of the method shown in FIG. 1.

One such method of selecting the high-frequency patch from the knowledge base is shown in FIG. 2. In such a method, for each sample low-frequency patch, a plurality of candidate low-frequency patches may be identified in the knowledge base using the subclass information categorizing the primitive contained in the sample low-frequency patch. Thus, indentifying each candidate low-frequency patch from the existing knowledge base comprises comparing a low-frequency primitive included within the sample low-frequency patch with a corresponding low-frequency primitive included within the candidate low-frequency patch, each low-frequency primitive belonging to a common subclass.

Each candidate low-frequency patch exists in the knowledge base as part of a patch pair, with the other patch in the pair being its associated candidate high-frequency patch. By selecting for each candidate low-frequency patch its corresponding candidate high-frequency patch, a plurality of candidate high-frequency patches may be obtained.

Next, for each sample low-frequency patch, one of its corresponding candidate high-frequency patches may be selected to be an inferred first-tier high-frequency patch and it may be used to form the coarse high-frequency component. Any suitable method may be used for selecting the inferred first-tier high-frequency patch from the candidate high-frequency patches.

Figure 3:
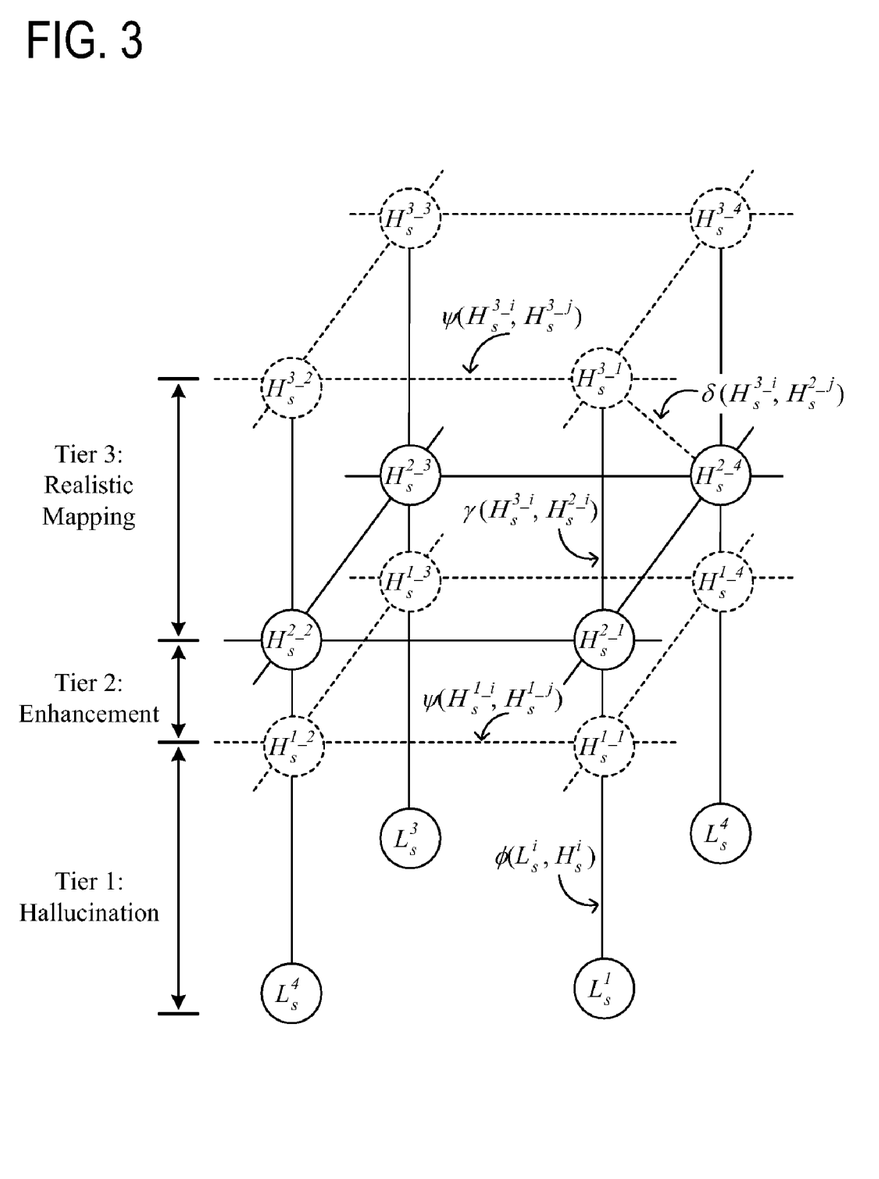
FIG. 3 shows a three-tiered network model used for upsampling an image.

One such method of selecting the inferred first-tier high-frequency patch from the candidate high-frequency patches is based on a Markov-chain approach, and is shown in FIG. 3. Such a method uses features of a Markov-chain to identify for each sample low-frequency patch an inferred first-tier high-frequency patch satisfying pre-defined relationships to nearby patches, such that the replacement of the sample low-frequency patch by the inferred first-tier high-frequency patch would yield a result with less visible artifacts. The pre-defined relationships are shown in more detail in FIG. 3.

After performing such a method to identify an inferred first-tier high-frequency patch for each sample low-frequency patch, the inferred first-tier high-frequency patches may then be formed into a coarse high-frequency component.

Method 10 at 14 includes constructing a high-compatibility component from the low-resolution, full-frequency image without using an existing knowledge base. The purpose of this step is to form a component that includes local compatibility information about neighboring patches, that when blended with the coarse high-frequency component, produces a resulting component with higher-compatibility than the coarse high-frequency component. Compatibility information may include, but is not limited to, compatible pixel values in regions of patch overlap.

Any suitable method may be used for constructing the high-compatibility component. One such method is based on a Laplacian pyramid approach applied to the low-resolution, full-frequency image. Such a method includes neighboring patch compatibility information that may be present in the low-resolution, full-frequency image but which may not be present in the hallucinated coarse high-frequency component due to the one to many mapping from a low-resolution patch to a high-resolution patch in the knowledge base.

Such a Laplacian pyramid approach comprises interpolating a Gaussian image from the low-resolution, full-frequency image, and using the Gaussian image as a foundation for interpolating a Laplacian image and as a basis for calculating a control function. The control function may be performed on the Laplacian image, yielding a high-compatibility component.

Returning to FIG. 1, at 16, method 10 includes combining the high-compatibility component with the coarse high-frequency component to yield an enhanced high-frequency component. Any suitable method may be used for combining the high-compatibility component with the coarse high-frequency component. One such method is shown in FIG. 2, and comprises adding the high-compatibility component to the coarse high-frequency component to form an intermediate component, which yields the enhanced high-frequency component.

At 18, method 10 includes constructing an improved high-frequency component from the enhanced high-frequency component. The term "realistic mapping" may be used to refer to this step in the upsampling process. The purpose of the improved high-frequency component is to further refine the enhanced high-frequency component to enforce more pre-defined relationships between neighboring patches, to yield a component with fewer visual artifacts. The pre-defined relationships are shown in more detail in FIG. 3.

Any suitable method may be used to construct the improved high-frequency component. One such method is shown in FIG. 2. Such a method accesses a knowledge base, as in the hallucination step, but here the candidate high-frequency patches in the knowledge base may be identified using a plurality of enhanced high-frequency patches existing in the enhanced high-frequency component. Thus, identifying each candidate high-frequency patch from the existing knowledge base comprises comparing a high-frequency primitive included within the enhanced high-frequency patch with a corresponding high-frequency primitive included within the candidate high-frequency patch, each high-frequency primitive belonging to a common subclass.

Next, for each enhanced high-frequency patch, one of its corresponding candidate high-frequency patches may be selected to be an inferred third-tier high-frequency patch and it will be used to form the improved high-frequency component. Any suitable method may be used for selecting the inferred third-tier high-frequency patch from the candidate high-frequency patches.

One such method of selecting the inferred third-tier high-frequency patch from the candidate high-frequency patches is based on a Markov network approach, and is shown in FIG. 3. Such a method uses features of the Markov network to identify for each enhanced high-frequency patch the inferred third-tier high-frequency patch satisfying pre-defined relationships to nearby patches, such that the replacement of the enhanced high-frequency patch by the inferred third-tier high-frequency patch may yield a result with less visible artifacts. The pre-defined relationships are shown in more detail in FIG. 3.

After performing such a method to identify an inferred third-tier high-frequency patch for each enhanced high-frequency patch, the inferred third-tier high-frequency patches may then be formed into an improved high-frequency component.

Lastly, at 20, method 10 includes blending the improved high-frequency component with the high-resolution, low-frequency image, interpolated from the low-resolution, full-frequency image, to yield a high-resolution image. Any suitable method may be used for such a blending. One such method is shown in FIG. 2, and comprises adding the improved high-frequency component to the high-resolution, low-frequency image, to yield a high-resolution image.

FIG. 2 schematically shows an exemplary process for upsampling a low-resolution, full-frequency image $L_R$ in accordance with method 10. First, low-resolution, full-frequency image $L_R$ undergoes a hallucination process. The hallucination process begins at 24, where the low-resolution, full-frequency image $L_R$ may be interpolated into a high-resolution, low-frequency image $H_{LF}$. Any suitable method may be used for interpolating the low-resolution, full-frequency image $L_R$ into a high-resolution, low-frequency image $H_{LF}$. One such method is bicubic interpolation.

The high-resolution, low-frequency image $H_{LF}$ may be decomposed into a low-frequency component $H_{C,0}$ comprising one or more low-frequency primitives. For each low-frequency primitive, a sample low-frequency patch including the low-frequency primitive may be defined.

FIG. 2 at 24 also shows accessing an existing knowledge base 28 during the hallucination process. The existing knowledge base 28 comprises patch pairs derived from a set of high-quality, high-resolution training images, each patch pair including a candidate high-frequency patch $H^{*i}_s$ representing high-frequency aspects of a plurality of neighboring pixels and a corresponding candidate low-frequency patch $L^{*i}_s$ representing low-frequency aspects of the same plurality of neighboring pixels.

As part of the hallucination process, for each sample low-frequency patch, a plurality of corresponding candidate low-frequency patches $L^{*i}_s$ from the existing knowledge base 28 may be identified. As described above, the candidate low-frequency patches may be identified in the knowledge base 28 using the subclass information categorizing the primitive contained in each patch.

For each candidate low-frequency patch $L^{*i}_s$, its associated candidate high-frequency patch $H^{*i}_s$ may be selected from its patch pair in the existing knowledge base 28. By selecting for each candidate low-frequency patch $L^{*i}_s$ its corresponding candidate high-frequency patch $H^{*i}_s$, a plurality of candidate high-frequency patches $H^{*i}_s$ may be obtained.

Continuing with the hallucination process, for each sample low-frequency patch an inferred first-tier high-frequency patch may be selected from the corresponding candidate high-frequency patches $H^{*i}_s$. The selection of each inferred first-tier high-frequency patch uses a Markov-chain approach, shown in more detail in FIG. 3. Such a Markov-chain approach may optimize both a mapping accuracy from each sample low-frequency patch to its corresponding inferred first-tier high-frequency patch, and compatibility between adjacent inferred first-tier high-frequency patches.

Continuing with the hallucination process, the last step of the hallucination process shown in FIG. 2 comprises constructing a coarse high-frequency component $H_{C,1}$ comprising the inferred first-tier high-frequency patches. Use of the Markov-chain approach described above may contribute to the coarse high-frequency component $H_{C,1}$ with fewer visual artifacts.

Continuing with FIG. 2, the next step of the exemplary upsampling process, enhancement, is shown, where a high-compatibility component $H_E$ is constructed from the low-resolution, full-frequency image $L_R$ without using existing knowledge base 28.

The purpose of this step is to form a component that includes local compatibility information about neighboring patches, that when blended with the coarse high-frequency component $H_{C,1}$, produces a resulting component with higher-compatibility than the coarse high-frequency component $H_{C,1}$. A Laplacian pyramid approach, or other suitable method, may used to construct the high-compatibility component $H_E$.

Continuing with FIG. 2, the next step of the enhancement process at 30 comprises combining the high-compatibility component $H_E$ with the coarse high-frequency component $H_{C,1}$ to yield an enhanced high-frequency component $H_{C,2}$. Here, the high-compatibility component $H_E$ may be added to the coarse high-frequency component $H_{C,1}$ to form the enhanced high-frequency component $H_{C,2}$.

The next step of the exemplary upsampling process shown in FIG. 2 is realistic mapping, where an improved high-frequency component $H_{C,3}$ may be constructed from the enhanced high-frequency component $H_{C,2}$. As discussed above, the purpose of the improved high-frequency component is to further refine the enhanced high-frequency component to enforce more relationships between neighboring patches, to yield a component with fewer visual artifacts.

The enhanced high-frequency component $H_{C,2}$ is decomposed into a plurality of enhanced high-frequency patches. Unlike the hallucination step, low-frequency patches are not used to select candidate patches from the knowledge base 28. Rather, the enhanced high-frequency patches may be used to identify a plurality of corresponding candidate high-frequency patches $H^*_s{}^i$ from existing knowledge base 28.

The candidate high-frequency patches may be identified in the knowledge base 28 using the subclass information categorizing the primitive contained in each patch. In other words, each enhanced high-frequency patch may now be used to find a plurality of corresponding candidate high-frequency patches from the existing knowledge base 28.

For each enhanced high-frequency patch, an inferred third-tier high-frequency patch may be selected from the corresponding candidate high-frequency patches $H^*_s{}^i$. The selection of each inferred third-tier high-frequency patch uses a Markov network approach, shown in more detail in FIG. 3.

Such a Markov network approach may optimize a mapping accuracy from each enhanced high-frequency patch to its corresponding inferred third-tier high-frequency patch, a compatibility between adjacent inferred third-tier high-frequency patches, and a compatibility between each enhanced high-frequency patch and its neighboring inferred third-tier high-frequency patch.

Continuing with the realistic mapping process, the last step of the realistic mapping process shown in FIG. 2 comprises constructing an improved high-frequency component $H_{C,3}$ comprising the inferred third-tier high-frequency patches.

The final step in the exemplary process for upsampling an image shown in FIG. 2 is at 32, where the improved high-frequency component $H_{C,3}$ may be blended with the high-resolution, low-frequency image, interpolated from the low-resolution, full-frequency image $L_R$, to yield a high-resolution image H. This blending step comprises adding the improved high-frequency component $H_{C,3}$ to the high-resolution, low-frequency image to yield a high-resolution image H.

FIG. 3 shows a three-tiered network model used for upsampling an image based on a Markov network approach.

The first tier in FIG. 3 shows hallucination based on a Markov-chain approach. First, a low-resolution, full-frequency image may be interpolated into a high-resolution, low-frequency image. The high-resolution, low-frequency image may be decomposed into a low-frequency component comprising one or more low-frequency primitives. For each low-frequency primitive, a sample low-frequency patch $L_s{}^i$, including the low-frequency primitive, may be defined. FIG. 3 shows four of a plurality of such sample low-frequency patches, namely $L_s{}^1$, $L_s{}^2$, $L_s{}^3$ and $L_s{}^4$.

The hallucination process begins by accessing an existing knowledge base to identify for each sample low-frequency patch $L_s{}^i$, a plurality of corresponding candidate low-frequency patches from the existing knowledge base. As described above, the candidate low-frequency patches may be identified in the knowledge base using the subclass information categorizing the primitive contained in each sample low-frequency patch.

As described above, each candidate low-frequency patch has an associated candidate high-frequency patch that exists as part of a patch pair in the knowledge base. By selecting for each candidate low-frequency patch, its associated candidate high-frequency patch, a plurality of corresponding candidate high-frequency patches may be obtained.

For each sample low-frequency patch $L_s{}^i$, an inferred first-tier high-frequency patch $H_s{}^{1-i}$ may be selected from the corresponding candidate high-frequency patches. The selection of each inferred first-tier high-frequency patch $H_s{}^{1-i}$ i uses a Markov-chain approach. Such a Markov-chain approach may optimize both a mapping accuracy from each sample low-frequency patch $L_s{}^1$ to its corresponding inferred first-tier high-frequency patch $H_s{}^{1-i}$, and a compatibility between adjacent inferred first-tier high-frequency patches $H_s{}^{1-i}$ and $H_s{}^{1-j}$.

More specifically, with the Markov-chain based inference algorithm, the MAP of the coarse high-frequency component $H_{C,1}$ may be obtained by maximizing the posterior probability $p(H|L)$ with $p(H)$ as the prior learnt knowledge. Considering mapping accuracy and compatibility, the MAP of the coarse high-frequency component $H_{C,1}$ may be constructed as follows:

$$\operatorname{argmax}\left(\prod_{(ij)} \psi_{ij}(H_s^{1-i}, H_s^{1-j}) \prod_i \phi_i(L_s^i, H_s^{1-i})\right),$$

where (ij) is the adjacent patch pair, $\psi_{ij}(H_s{}^{1-i}, H_s{}^{1-j})$ is the compatibility function between adjacent inferred first-tier high-frequency patches $H_s{}^{1-i}$ and $H_s{}^{1-j}$ and $\phi_i(L_s{}^i, H_s{}^{1-i})$ is the accuracy function of mapping from each sample low-frequency patch $L_s{}^i$ to its corresponding inferred first-tier high-frequency patch $H_s{}^{1-i}$.

Thus, the result of the Markov-chain approach is a coarse high-frequency component $H_{C,1}$ comprising the inferred first-tier high-frequency patches $H_s^{1-i}$. FIG. 3 shows four of a plurality of such first-tier high-frequency patches, namely $H_s^{1-1}$, $H_s^{1-2}$, $H_s^{1-3}$ and $H_s^{1-4}$.

The second tier shows an enhancement step, where an enhanced high-frequency component $H_{C,2}$ is constructed from the coarse high-frequency component $H_{C,1}$ and from the low-resolution, full-frequency image without using the existing knowledge base. The enhanced high-frequency component $H_{C,2}$ comprises a plurality of enhanced high-frequency patches, $H_s^{2-i}$. FIG. 3 shows four of a plurality of such enhanced high-frequency patches, namely $H_s^{2-1}$, $H_s^{2-2}$, $H_s^{2-3}$ and $H_s^{2-4}$.

The third tier shows realistic mapping based on a Markov network approach, where an improved high-frequency component $H_{C,3}$ may be constructed from the enhanced high-frequency component $H_{C,2}$. The enhanced high-frequency patches $H_s^{2-i}$, each containing a high-frequency primitive, are used to identify a plurality of corresponding candidate high-frequency patches from the existing knowledge base.

As described above, the candidate high-frequency patches may be selected by accessing an existing knowledge base to identify for each enhanced high-frequency patch $H_s^{2-i}$, a plurality of corresponding candidate high-frequency patches from the existing knowledge base, using the subclass information categorizing the primitive contained in each patch. Thus, for each enhanced high-frequency patch $H_s^{2-i}$, a plurality of corresponding candidate high-frequency patches may be obtained.

For each enhanced high-frequency patch $H_s^{2-i}$, an inferred third-tier high-frequency patch $H_s^{3-i}$ may be selected from the corresponding candidate high-frequency patches. The selection of each inferred third-tier high-frequency patch $H_s^{3-i}$ uses a Markov network approach. Such a Markov network approach may optimize a mapping accuracy from each enhanced high-frequency patch $H_s^{2-i}$ to its corresponding inferred third-tier high-frequency patch $H_s^{3-i}$, a compatibility between adjacent inferred third-tier high-frequency patches $H_s^{3-i}$ and $H_s^{3-j}$, and a compatibility between each enhanced high-frequency patch $H_s^{2-i}$ and its neighboring inferred third-tier high-frequency patch $H_s^{3-j}$.

More specifically, with the Markov network based inference algorithm, the MAP of the improved high-frequency component $H_{C,3}$ may be obtained by maximizing the posterior probability $p(H|H_{C,2})$. Thus the MAP of $H_{C,3}$ may be constructed as follows, $$\left( \prod_i \gamma_i(H_s^{3-i}, H_s^{2-i}) \prod_{(ij)} \psi_{ij}(H_s^{3-i}, H_s^{3-j}) \prod_{(ij)} \delta_{ij}(H_s^{3-i}, H_s^{2-j}) \right),$$

where $\gamma_i(H_s^{3-i},H_s^{2-i})$ is the mapping accuracy from each enhanced high-frequency patch $H_s^{2-i}$ to its corresponding inferred third-tier high-frequency patch $H_s^{3-i}$, $\psi_{ij}(H_s^{3-i},H_s^{3-j})$ is a compatibility between adjacent inferred third-tier high-frequency patches $H_s^{3-i}$ and $H_s^{3-j}$, and $\delta_{ij}(H_s^{3-i},H_s^{2-j})$ is a compatibility between each enhanced high-frequency patch $H_s^{2-j}$ and its neighboring inferred third-tier high-frequency patch $H_s^{3-j}$.

The posterior probability $p(H|H_{C,2})$ may be simplified, such that MAP of $H_{C,3}$ may be approximated by $$\text{argmax}\left( \prod_i \gamma_i(H_s^{3-i}, H_s^{2-i}) \prod_{(ij)} \psi_{ij}(H_s^{3-i}, H_s^{3-j}) \right),$$

where the mapping accuracy $\gamma_i(H_s^{3-i},H_s^{2-i})$ may be evaluated by the Euclidean distance between each enhanced high-frequency patch $H_s^{2-i}$ and its corresponding inferred third-tier high-frequency patch $H_s^{3-i}$, and the compatibility function $\psi_{ij}(H_s^{3-i},H_s^{3-j})$ may be evaluated by the sum squared difference of the overlapped region between adjacent inferred third-tier high-frequency patches $H_s^{3-i}$ and $H_s^{3-j}$.

Thus, the end result of the Markov network approach is an improved high-frequency component $H_{C,3}$ comprising a plurality of inferred third-tier high-frequency patches $H_s^{3-i}$. FIG. 3 shows four of a plurality of such inferred third-tier high-frequency patches, namely $H_s^{3-1}$, $H_s^{3-2}$, $H_s^{3-3}$ and $H_s^{3-4}$.

The improved high-frequency component $H_{C,3}$ may then be blended with the high-resolution, low-frequency image to yield a high-resolution image.

Figure 4:
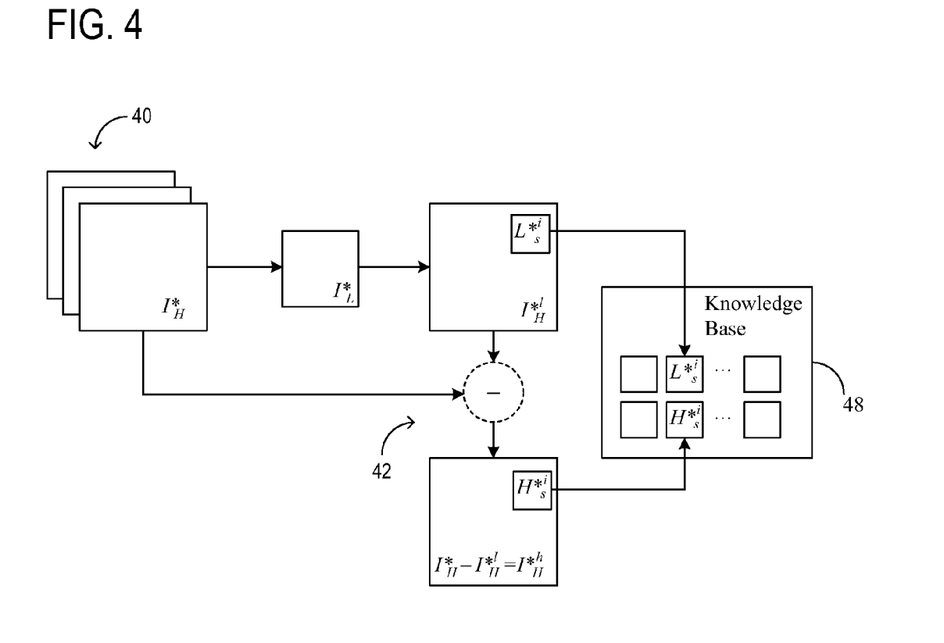
FIG. 4 schematically shows an exemplary process of training a knowledge base for use in upsampling an image.

FIG. 4 schematically shows an exemplary process of training a knowledge base for use as an existing knowledge base during hallucination and realistic mapping.

A plurality of high-quality, high-resolution training images 40 may be used in training the knowledge base 48. For each high-quality, high-resolution training image, corresponding low- and high-resolution image information is extracted. Thus, FIG. 4 shows such an exemplary extraction process for the case of one of the plurality of high-quality, high-resolution training images.

FIG. 4 begins with a high-quality, high-resolution training image $I^*_H$, which may be used to create a low-resolution training image $I^*_L$. Any suitable method may be used to create the low-resolution training image $I^*_L$ from the high-quality, high-resolution training image $I^*_H$. One such method is blurring and downsampling.

FIG. 4 next shows interpolating the low-resolution training image $I^*_L$ into a high-resolution, low-frequency training image $I^*_H{}^l$. Any suitable method may be used for such an interpolation. One such method is bicubic interpolation.

Next, at 42, FIG. 4 shows creating a high-resolution, high-frequency training image $I^*_H{}^h$ by subtracting the high-resolution, low-frequency training image $I^*_H{}^l$ from the high-quality, high-resolution training image $I^*_H$.

The high-resolution, low-frequency training image $I^*_H{}^l$ comprises a plurality of candidate low-frequency patches $L^*_s{}^i$, where each candidate low-frequency patch $L^*_s{}^i$ includes a low-frequency primitive. Likewise, the high-resolution, high-frequency training image $I^*_H{}^h$ comprises a plurality of candidate high-frequency patches $H^*_s{}^i$, where each candidate high-frequency patch $H^*_s{}^i$ includes a high-frequency primitive.

Lastly, each candidate low-frequency patch $L^*_s{}^i$ and its corresponding candidate high-frequency patch $H^*_s{}^i$ form a patch pair in the knowledge base 48.

It should be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method of upsampling an image, the method comprising:
   constructing a coarse high-frequency component from a low-resolution, full-frequency image, the coarse high-frequency component comprising a plurality of inferred first-tier high-frequency patches obtained from an existing knowledge base;
   constructing a high-compatibility component from the low-resolution, full-frequency image without using the existing knowledge base;
   combining the high-compatibility component with the coarse high-frequency component to yield an enhanced high-frequency component, the enhanced high-frequency component comprising a plurality of enhanced high-frequency patches;
   constructing an improved high-frequency component from the enhanced high-frequency component, the improved high-frequency component comprising a plurality of inferred third-tier high-frequency patches obtained from the existing knowledge base; and
   blending the improved high-frequency component with a high-resolution, low-frequency image, interpolated from the low-resolution, full-frequency image, to yield a high-resolution image.

2. The method of claim 1, where the low-resolution, full-frequency image is interpolated into a high-resolution, low-frequency image comprising a low-frequency component, the low-frequency component comprising a plurality of sample low-frequency patches.

3. The method of claim 1, where a Markov-chain is used to identify the inferred first-tier high-frequency patches.

4. The method of claim 1, where a Markov network is used to identify the inferred third-tier high-frequency patches.

5. The method of claim 1, where the high-compatibility component is constructed from the low-resolution, full-frequency image using a Laplacian pyramid approach.

6. A method of upsampling an image using an existing knowledge base, the existing knowledge base including a plurality of patch pairs derived from a set of high-resolution training images, each patch pair including a candidate high-frequency patch representing high-frequency aspects of a plurality of neighboring pixels and a corresponding candidate low-frequency patch representing low-frequency aspects of the plurality of neighboring pixels, the method comprising:
   interpolating a low-resolution, full-frequency image into a high-resolution, low frequency image;
   decomposing the high-resolution, low-frequency image into a low-frequency component comprising one or more low-frequency primitives;
   defining for each low-frequency primitive, a sample low-frequency patch including the low-frequency primitive;
   identifying for each sample low-frequency patch a plurality of corresponding candidate low-frequency patches from the existing knowledge base, and for each candidate low-frequency patch selecting from its patch pair an associated candidate high-frequency patch;
   identifying for each sample low-frequency patch an inferred first-tier high-frequency patch selected from the corresponding candidate high-frequency patches;
   constructing a coarse high-frequency component comprising the inferred first-tier high-frequency patches;
   constructing a high-compatibility component from the low-resolution, full-frequency image without using the existing knowledge base;
   combining the high-compatibility component with the coarse high-frequency component to yield an enhanced high-frequency component, the enhanced high-frequency component comprising a plurality of enhanced high-frequency patches;
   identifying for each enhanced high-frequency patch a plurality of corresponding candidate high-frequency patches from the existing knowledge base;
   identifying for each enhanced high-frequency patch an inferred third-tier high-frequency patch selected from the corresponding candidate high-frequency patches;
   constructing an improved high-frequency component comprising the inferred third-tier high-frequency patches; and
   blending the improved high-frequency component with the high-resolution, low-frequency image to yield a high-resolution image.

7. The method of claim 6, where interpolating a low-resolution, full-frequency image into a high-resolution, low-frequency image includes using bicubic interpolation.

8. The method of claim 6, where a Markov-chain is used to identify the inferred first-tier high-frequency patches.

9. The method of claim 8, where the Markov-chain is used to optimize both a mapping accuracy from each sample low-frequency patch to its corresponding inferred first-tier high-frequency patch, and a compatibility between adjacent inferred first-tier high-frequency patches.

10. The method of claim 6, where identifying each candidate low-frequency patch from the existing knowledge base comprises comparing a low-frequency primitive included within the sample low-frequency patch with a corresponding low-frequency primitive included within the candidate low-frequency patch, each low-frequency primitive belonging to a common subclass.

11. The method of claim 6, where identifying each candidate high-frequency patch from the existing knowledge base comprises comparing a high-frequency primitive included within the enhanced high-frequency patch with a corresponding high-frequency primitive included within the candidate high-frequency patch, each high-frequency primitive belonging to a common subclass.

12. The method of claim 6, where the high-compatibility component is constructed from the low-resolution, full-frequency image using a Laplacian pyramid approach comprising:
   interpolating a Gaussian image from the low-resolution, full-frequency image;
   using the Gaussian image as a foundation for interpolating a Laplacian image and as a basis for calculating a control function; and
   performing the control function on the Laplacian image.

13. The method of claim 6, where combining the high-compatibility component with the coarse high-frequency component comprises adding the high-compatibility component to the coarse high-frequency component to form an intermediate component, which yields the enhanced high-frequency component.

14. The method of claim 6, where a Markov network is used to identify the inferred third-tier high-frequency patches.

15. The method of claim 14, where the Markov network is used to optimize a mapping accuracy from each enhanced high-frequency patch to its corresponding inferred third-tier high-frequency patch, a compatibility between adjacent inferred third-tier high-frequency patches, and a compatibility between each enhanced high-frequency patch and its neighboring inferred third-tier high-frequency patch.

16. The method of claim 15, where the mapping accuracy is evaluated by the Euclidean distance between from each enhanced high-frequency patch and its corresponding inferred third-tier high-frequency patch.

17. The method of claim 15, where the compatibility is evaluated by the sum squared difference of the overlapped region between adjacent inferred third-tier high-frequency patches.

18. The method of claim 15, where the compatibility between each enhanced high-frequency patch and its neighboring inferred third-tier high-frequency patch is evaluated by evaluating both the mapping accuracy from each enhanced high-frequency patch to its corresponding inferred third-tier high-frequency patch and the compatibility between adjacent inferred third-tier high-frequency patches.

19. The method of claim 6, where blending the improved high-frequency component with the high-resolution, low-frequency image comprises adding the improved high-frequency component to the high-resolution, low-frequency image to yield a high-resolution image.

20. A method of using a high-resolution, high-frequency image including a plurality of high-frequency patches in an upsampling process, the method comprising:
  identifying for each high-frequency patch a set of corresponding candidate high-frequency patches from an existing knowledge base;
  selecting from each set of candidate high-frequency patches, an inferred high-frequency patch; and
  constructing an improved high-frequency component comprising the inferred high-frequency patches.

* * * * *